United States Patent [19]

Hisamoto et al.

[11] Patent Number: 4,530,776

[45] Date of Patent: Jul. 23, 1985

[54] CLEANING COMPOSITION FOR WAX REMOVAL

[75] Inventors: Iwao Hisamoto, Suita; Yukio Omure, Takatsuki, both of Japan

[73] Assignee: Kaikin Kogyo Co., Ltd., Osaka, Japan

[21] Appl. No.: 582,761

[22] Filed: Feb. 23, 1984

[30] Foreign Application Priority Data

Feb. 28, 1983 [JP] Japan .................................. 58-32517

[51] Int. Cl.³ .......................... B08B 3/08; B08B 3/12; C11D 7/30; C11D 7/50
[52] U.S. Cl. .................................... 252/153; 134/40; 252/162; 252/171; 252/172; 252/DIG. 9
[58] Field of Search ............... 252/153, 162, 170, 171, 252/172, DIG. 9

[56] References Cited

U.S. PATENT DOCUMENTS

| | | | |
|---|---|---|---|
| 3,085,116 | 4/1963 | Kvalnes | 260/652.5 |
| 3,330,776 | 7/1967 | Coe | 252/364 |
| 3,509,061 | 4/1970 | Zisman | 252/171 |
| 3,634,274 | 1/1972 | Barton | 252/171 |
| 3,691,092 | 9/1972 | Floria | 252/364 |
| 4,443,364 | 4/1984 | Klinger | 252/547 |

FOREIGN PATENT DOCUMENTS

| | | | |
|---|---|---|---|
| 55-131099 | 10/1980 | Japan | 252/171 |
| 55-144100 | 11/1980 | Japan | 252/162 |

*Primary Examiner*—Dennis L. Albrecht
*Attorney, Agent, or Firm*—Armstrong, Nikaido, Marmelstein & Kubovcik

[57] ABSTRACT

A cleaning composition comprising (a) a halogenated and/or non-halogenated hydrocarbon, (b) a fluorinated alcohol, and optionally (c) a polar organic solvent other than the components (a) and (b), the composition being useful for removing waxes, which are used for temporarily fixing objects to be polished in the electronics or optical industry to a support, from the surfaces of the objects after the detachment from the support.

1 Claim, No Drawings

CLEANING COMPOSITION FOR WAX REMOVAL

BACKGROUND OF THE INVENTION

The present invention relates to a cleaning composition, and more particularly to a solvent mixture suitable for removing a wax which is used for fixing workpieces used in the electronics industry and the optical industry, particularly for fixing workpieces such as silicon wafer, magnetic head and lens onto a support upon polishing them, and which remains on the surfaces of the workpieces after taking away them from the support.

When a silicon wafer, a magnetic head, a lens and so on are polished, waxes are employed for temporarily fixing them onto a support such as a ceramic block. For instance, a silicon wafer is fixed by waxes onto the flat surface of a ceramic plate upon polishing it in a rapping step. After polishing, the silicon wafer is detached from the ceramic plate. However, the waxes remain on the surface of the silicon wafer and cause a functional serious obstacle to the silicon wafer.

Various methods have been adopted for removing such waxes. For instance, a supersonic wave treatment or immersion treatment in boiling bath using a halogenated hydrocarbon solvent such as trichloroethylene or 1,1,1-trichloroethane has been adopted for removing waxes sticking to the surfaces of workpieces as mentioned above. Most of the wax residue on the surfaces of the workpieces is removed by these methods. However, it is observed by a microscope (200 to 400 magnifications) that a slight amount of the wax still remains in the form of fine spots on the surfaces of the workpieces, and conventional methods cannot sufficiently remove the wax residues. There has not been known a method for effectively and sufficiently removing the wax residues without imparing silicon wafer, magnetic head, lens and so on.

SUMMARY OF THE INVENTION

According to the present invention, there is provided a cleaning composition suitable for removing waxes comprising (a) at least one hydrocarbon compound selected from the group consisting of a halogenated hydrocarbon and a non-halogenated hydrocarbon, (b) a fluorinated alcohol, and optionally (c) a polar organic solvent other than the components (a) and (b).

The cleaning composition of the present invention is suitable particularly for removing waxes used for temporarily fixing workpieces to supports upon polishing treatment in the electronics and optical industries and still remaining on the surfaces thereof after the detachment from the supports. The composition of the invention can remove the waxes from a silicon wafer, a magnetic head, a lens and so on in a short period of time without remaining fine spot wax residues as mentioned above and without imparing the objects to be cleaned.

DETAILED DESCRIPTION

The composition of the present invention contains a halogenated or non-halogenated hydrocarbon compound (a) and a fluorinated alcohol (b) as essential components, and further may optionally contains a polar organic solvent (c) other than the above components (a) and (b).

Representative examples of the halogenated hydrocarbon used in the present invention are, for instance, methylene chloride, 1,1,1-trichloroethane, trichloroethylene, tetrachloroethylene, 1,3-dichloropropane, 1,3-dichlorobutane, epichlorohydrin, tetrachlorodifluoroethane, trichlorotrifluoroethane, and the like. Representative examples of the non-halogenated hydrocarbon used in the present invention are, for instance, octane, cyclohexane, toluene, xylene, petroleum ether, solvent naphtha, and the like. The hydrogenated and non-hydrogenated hydrocarbons (a) may be employed alone or in admixture thereof.

The fluorinated alcohols (b) used in the present invention are alcohols having at least 2 fluorine atoms and at least 2 carbon atoms, shown by the general formula:

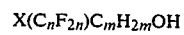

wherein X is hydrogen atom or fluorine atom, m is an integer of 1 to 3, and n is an integer of 1 to 10. Representative examples of the fluorinated alcohols (b) are, for instance,

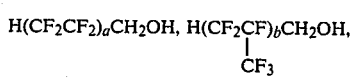

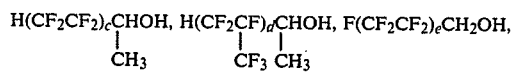

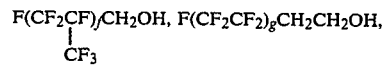

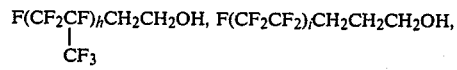

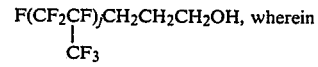

a, c, e, g and i are an integer of 1 to 5, and b, d, f, h and j are an integer of 1 to 3. The fluorinated alcohols may be employed alone or in admixture thereof.

Representative examples of the polar organic solvent other than the halogenated and non-halogenated hydrocarbons (a) and the fluorinated alcohols (b), which may be optionally employed in the present invention as a component (c), are for instance an alcohol such as methyl alcohol, ethyl alcohol, propyl alcohol, isopropyl alcohol, butyl alcohol, isobutyl alcohol, t-butyl alcohol, cyclohexanol, cyclopentanol or benzyl alcohol; a ketone such as acetone, methyl propyl ketone, methyl isopropyl ketone, methyl isobutyl ketone or cyclohexanone; a nitrile such as acetonitrile, propionitrile, butyronitrile, isobutyronitrile or benzonitrile; a nitroalkane such as nitromethane, nitroethane or nitropropane; nitrobenzene, an ethylene glycol monoether such as β-oxyethyl methyl ether or β-oxyethyl butyl ether; diethylene glycol ethyl ether, furfural, formaldehyde, trifluoroacetic acid. The polar organic solvents may be employed alone or in admixture thereof.

The mixing ratio of the components (a) and (b) or the components (a), (b) and (c) is not particularly limited. These components can be admixed in all proportions so long as they dissolve in each other. Preferably, the mixing ratio of the component (a) to the component (b) is selected from 90 to 30:10 to 70 by weight. In case that the components (a), (b) and (c) are employed, it is preferable to admix them in an (a)/(b)/(c) ratio of 90 to 30:5 to 65:5 to 65 by weight, especially 80 to 60:10 to 30:10 to 30 by weight.

The respective components included in the composition of the invention synergistically act on waxes sticking onto workpieces such as silicon wafers, magnetic heads and lenses, thus the waxes are removed in a short perior of time so that the surfaces of silicon wafers, magnetic heads and lenses are cleaned with little fine spot wax residues. Certain combinations of the solvents form azeotropes, e.g. a solvent mixture of tetrachlorodifluoroethane, 2,2,3,3-tetrafluoropropyl alcohol and nitromethane in a ratio of 80:13.3:6.7 by weight. The azeotropic mixtures are preferred, since the recovery and reuse of the composition are easy.

The cleaning composition of the present invention can be applied to wax removal in a known manner by contacting a wax-contaminated object with the composition. For instance, wax residues are removed from the surface of a workpiece to be treated by immersing the workpiece in a bath of a hot or boiling composition of the invention, or by spraying, sprinkling or coating the cleaning composition onto the workpiece and then wiping off the composition. Preferably, the removal of waxes is conducted by immersing the workpiece in the hot or boiling composition bath and applying supersonic waves.

The cleaning composition of the present invention may contain other solvents and additives such as organic acids, surface active agents and stabilizers, as occasion demands. The total amount of these other solvents and additives are usually not more than 30 parts by weight per 100 parts by weight of the mixture of the components (a) and (b) or the components (a), (b) and (c).

In addition to effective removal of the wax residues, the composition of the present invention is also useful for removing persistent stains such as resins and oily or tarry carbonized substances which cannot be easily removed by usual cleaners.

The present invention is more specifically described and explained by means of the following Examples and Comparative Examples, in which all parts are by weight. It is to be understood that the present invention is not limited to the Examples, and various changes and modifications may be made in the invention without departing from the spirit and scope thereof.

EXAMPLES 1 TO 6 AND COMPARATIVE EXAMPLES 1 TO 5

A cleaning composition shown in Table 1 was added to a bath maintained at 70° C. A silicon wafer having a diameter of 2 inches onto which a sticky wax was stuck, was immersed in the bath with supersonic wave application for 3 minutes, then immersed in trichloroethylene for 30 seconds to rinse and dried.

No wax residues were observed on the treated silicon wafer by nacked eye. The treated wafer was then observed by a microscope of 200 magnifications, and the number of wax spots having a diameter of less than 0.5 $\mu$m. and wax spots having a diameter of not less than 1.5 $\mu$m. was counted.

The results are shown in Table 1.

In Table 1, the cleaning composition of Example 1 is an azeotropic mixture, and flon-112 indicates tetrachlorodifluoroethan and TFPA indicates 2,2,3,3-tetrafluoropropyl alcohol ($HCF_2CF_2CH_2OH$).

TABLE 1

|  | Composition (part) | | | Number of wax spots | |
|---|---|---|---|---|---|
|  | Hydrocarbon (a) | Fluorinated alcohol (b) | Polar organic solvent (c) | Spot having a diameter of less than 0.5 $\mu$m. | Spot having a diameter of not less than 0.5 $\mu$m. |
| Ex.1 | Flon-112 (80) | TFPA (13.3) | Nitromethane (6.7) | 1 | 1 |
| Ex.2 | 1,1,1-Tricholorethane (60) | TFPA (20) | Methyl isopropyl ketone (20) | 2 | 1 |
| Ex.3 | Trichloroethylene (30) | TFPA (10) | Acetonitrile (60) | 1 | 0 |
| Ex.4 | Flon-112/toluene of 50/50 (60) | TFPA (30) | Isobutanol (10) | 2 | 2 |
| Ex.5 | Xylene (50) | TFPA (35) | Isopropanol (15) | 2 | 1 |
| Ex.6 | Flon-112 (85.7) | TFPA (14.3) | — | 3 | 1 |
| Com. Ex.1 | — | TFPA (66.5) | Nitromethane (33.5) | 4 | 11 |
| Com. Ex.2 | Trichloroethylene (100) | — | — | 5 | 9 |
| Com. Ex.3 | 1,1,1-Trichloroethane (100) | — | — | 7 | 13 |
| Com. Ex.4 | Flon-112 (100) | — | — | 11 | 8 |
| Com. Ex.5 | — | TFPA (100) | — | 6 | 10 |

In addition to the ingredients used in the Examples, other ingredients can be used in the Examples as set forth in the specification to obtain substantially the same results.

What we claim is:

1. A cleaning composition comprising tetrachlorodifluoroethane, 2,2,3,3-tetrafluoropropyl alcohol and nitromethane in a ratio of 80:13.3:6.7 by weight.

* * * * *